Sept. 14, 1926.

C. A. DE VELBISS

MILK CAN OPENER AND HOLDER

Filed Nov. 8, 1921

1,599,992

INVENTOR.
CHARLES A. DE VELBISS
BY A. B. Bowman
ATTORNEYS.

Patented Sept. 14, 1926.

1,599,992

UNITED STATES PATENT OFFICE.

CHARLES A. DE VELBISS, OF EAST SAN DIEGO, CALIFORNIA.

MILK-CAN OPENER AND HOLDER.

Application filed November 8, 1921. Serial No. 513,645.

My invention relates to can openers and holders, adapted more particularly for condensed milk cans; and some of the objects of my improvement are: To provide a device which may be easily and quickly applied to a container such as is used for the conventional canned milk which shall serve as an opener, a stopper or sealer, a holder and a handle for pouring the milk from the can, after the manner of a pitcher, except that it is preferably turned sideways; facility of application to a can and removal therefrom; facility of use; low first cost; lightness; and durability.

Figure 1:
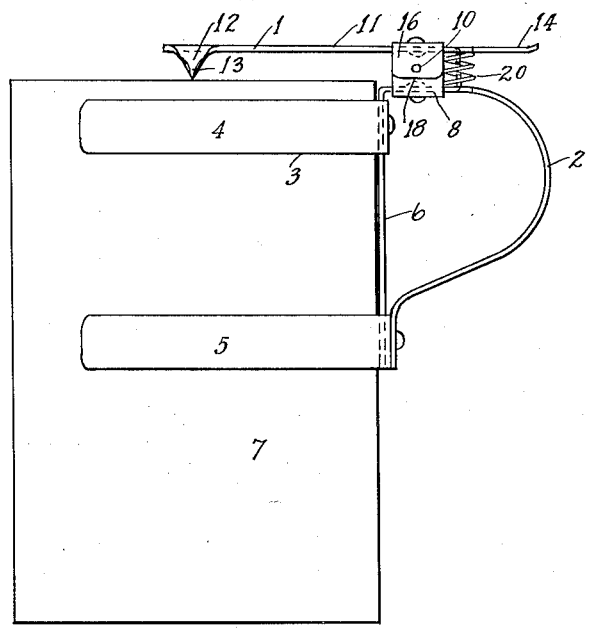
Figure 3:
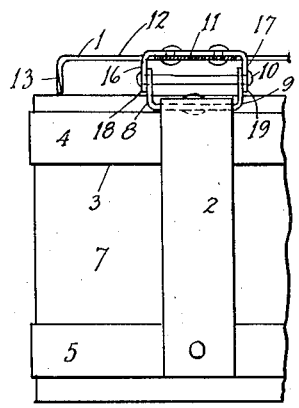
Figure 2:
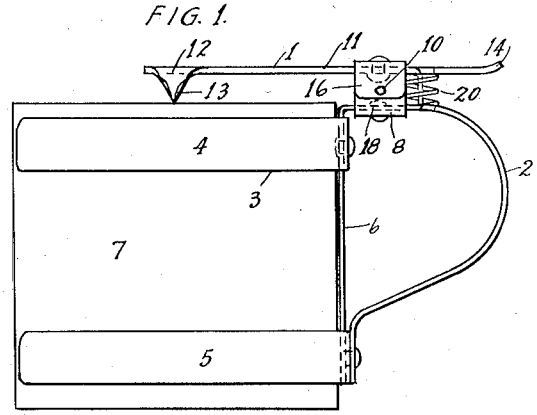
Figure 4:
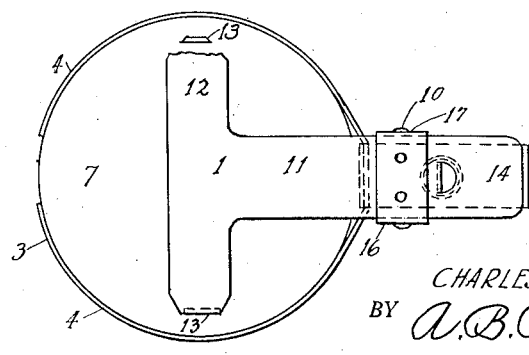

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view showing a tall milk can with my device positioned thereon ready for use; Fig. 2 is a similar view of a short milk can; Fig. 3, is a rear elevation of a fragmentary portion thereof; and Fig. 4 is a top or plan view showing a portion broken away to facilitate the illustration.

Similar characters of reference refer to similar parts, throughout the several views of the drawings.

My can opened and holder comprises a can puncturing and sealing element 1, a handhold or handle 2, and a spring can-clamping or holding element 3.

The clamping element 3 is preferably formed with one upper, circular, flat spring 4 and a similar, lower spring 5. These springs 4 and 5 are joined together by an upright, flat bar 6, which is designed to lie flat against the cylindrical wall of the can 7.

To the holder 3 is rigidly secured the handle 2 in the same plane with the bar 6. The handle 2 is formed with upward-extending ears 8 and 9 on its upper horizontal portion, which are provided with holes to receive a pivot or hinge pin 10.

The element 1 comprises a spring plate 11, formed with a cross-arm 12, at its outer end, which in turn is formed, at each end, with a depending point 13, which are driven, by a blow, through the top of the can, forming simultaneously substantially diametrically opposite punctures one of which is for emitting the milk and the other for admitting the atmospheric air. At the rear end of the plate 11 is formed a thumb-piece 14. Between its ends the plate 11 is formed with depending ears 16 and 17 at its side, the ears 16 and 17 are provided with holes, 18 and 19, corresponding with holes in ears 8 and 9, to receive the hinge pin 10. By this means element 1 is fulcrumed on the handle 2, so that, upon pressure with the thumb on the thumb-piece 15 the points 13 are lifted from the punctures or openings formed thereby.

Just to the rear of the pin 10 is placed an open-coil spring 20, acting between the rear end of plate 11 and handle 2. Through this means the points 13 are yieldingly pressed into the punctures or openings formed in the can, serving to close and seal the openings against the entering of dust, microbes and insects.

When a can of evaporated milk, for example, is to be used, my opener is applied to the can as illustrated, by forcing the spring clamps 4 and 5 over the can, so that the plate 11 extends over the top of the can. A sharp blow is then given over the points 13 driving them through the tin and forming punctures or openings. The handle 2 is then grasped, the thumb is pressed upon thumb-piece 14, raising the points 13 from the openings, and milk may be poured from one of the openings. Upon releasing the thumb-piece, points 13 are pressed into the openings by the spring 20, sealing the openings. Thus a portion of the milk in the can may be used and the rest preserved fresh and clean for subsequent use. When all the milk has been used, the holder may be readily stripped from the can and applied to another can.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention so that any one may understand its construction and use, I claim—

1. A can opener and holder, including a pair of spaced circular clamp members adapted to extend more than half way around a milk can, a handle with a straight flat bar portion, adapted to rest in an upright position flatly against said can to which said clamp members are secured and provided with an extended loop portion forming a handle, an opener pivotally mounted on said handle said opener being formed with integral puncturing points diametrically arranged relatively to the top of the can, when said can is held in said clamps, the points of said holder being supported by said clamps and said handle poised in diametrical alinement over the can.

2. A can opener and holder, including a pair of spaced circular clamp members adapted to extend more than half way around a milk can, a handle with a straight flat bar portion, adapted to rest in an upright position flatly against said can to which said clamp members are secured and provided with an extended loop portion forming a handle, an opener arranged in the form of a lever provided on said handle with points at one end, a thumb-piece at the opposite end and fulcrumed intermediate the ends, and a compression spring interposed between said handle and said thumb-piece tending to hold the points of said opener in engagement with the can.

In testimony whereof, I have hereunto set my hand at San Diego, California, this 31st day of October 1921.

CHARLES A. DE VELBISS.